(No Model.) 3 Sheets—Sheet 2.
R. MIEHLE.
MECHANICAL MOVEMENT FOR CONVERTING MOTION.
No. 429,695. Patented June 10, 1890.
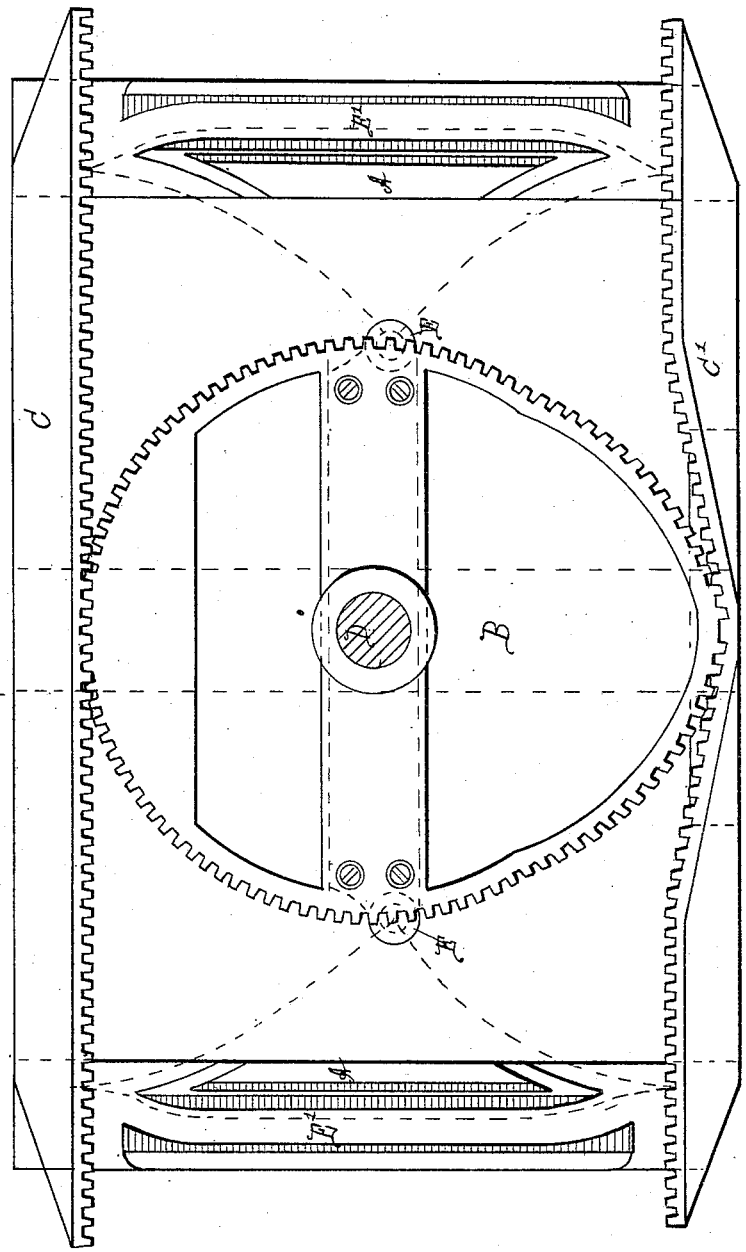
Witnesses:
P. Leinhart
H. Schafer
Inventor:
Robert Miehle

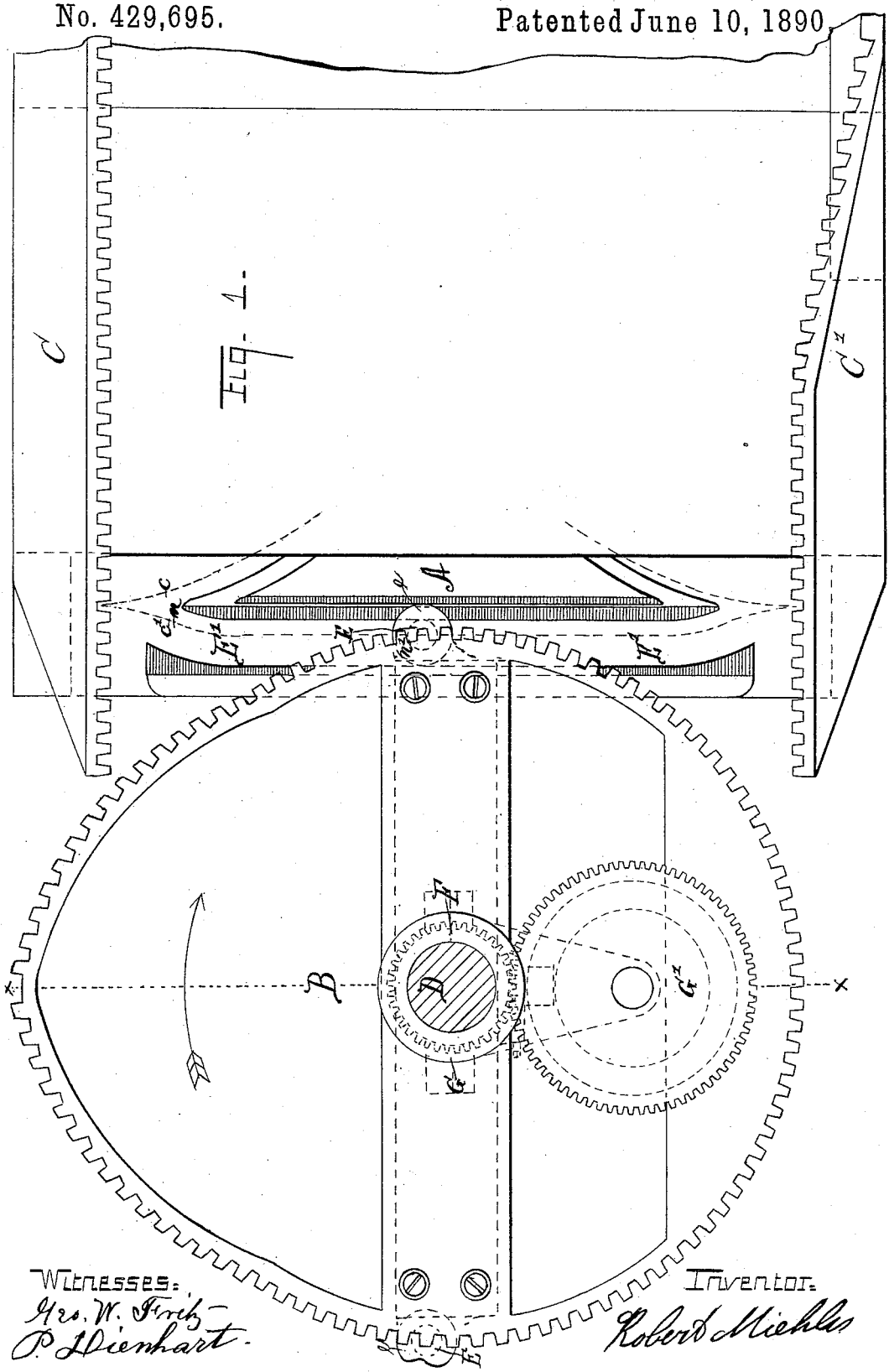

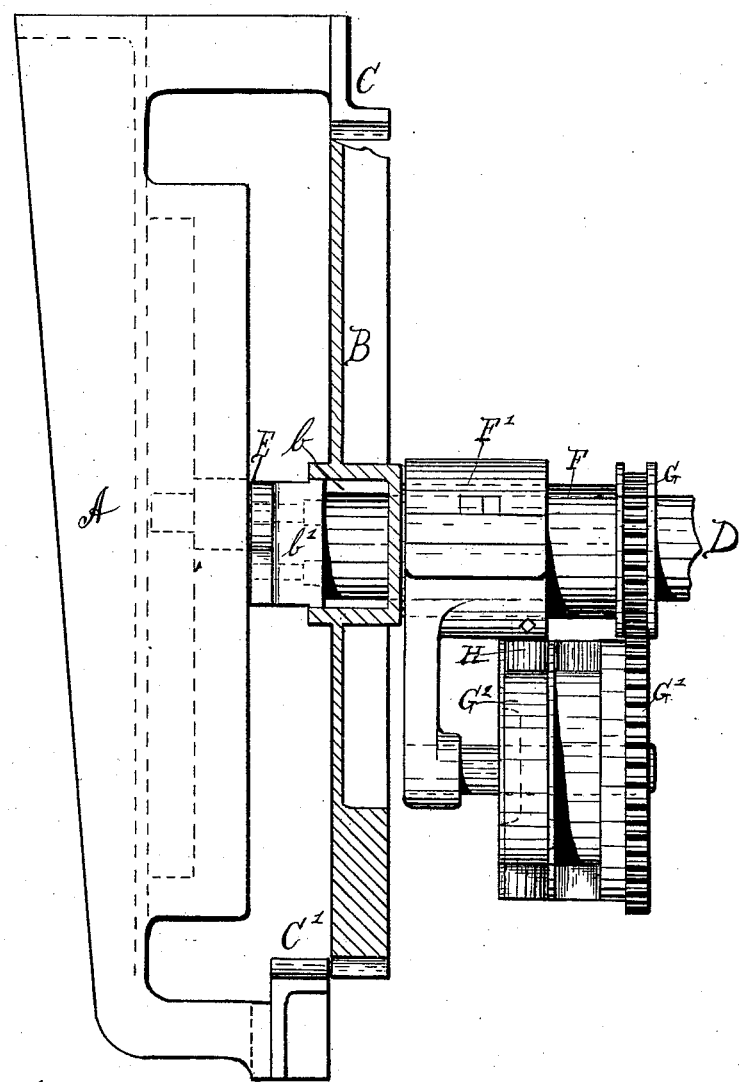
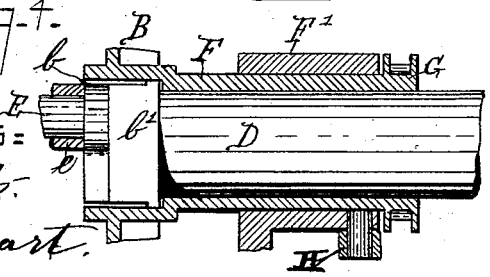

UNITED STATES PATENT OFFICE.

ROBERT MIEHLE, OF CHICAGO, ILLINOIS.

MECHANICAL MOVEMENT FOR CONVERTING MOTION.

SPECIFICATION forming part of Letters Patent No. 429,695, dated June 10, 1890.

Application filed July 18, 1887. Serial No. 244,677. (No model.)

*To all whom it may concern:*

Be it known that I, ROBERT MIEHLE, a citizen of the United States, residing at the city of Chicago, county of Cook, and State of Illinois, have invented an Improvement in Mechanical Movement for Converting Motion for Printing-Presses or other Machinery in which a reciprocating movement is required, of which the following is a specification.

My invention consists in attaching two parallel racks to the printing-press bed-plate or like reciprocating mechanism, which are fixed in different vertical and parallel planes, between which a gear-wheel may move longitudinally on its shaft, and by means of such motion engage alternately one or the other of said racks; and it also further consists in so constructing the said racks and pinion as to give variantly-reciprocating motion, and to attain said ends I construct my new device substantially as hereinafter shown and described.

Figure 1 shows in side elevation an irregular gear-wheel B and the end of a rack-frame and parts of an upper and lower rack C and C' attached to said frame, attached to or forming a part of a printing-press bed-plate, together with guideways between the ends of said racks, said mechanism being shown engaged with auxiliary mechanism forming a part of the wheel B. Fig. 2 shows a part of Fig. 1 in end view, taken on a plane $x\ x$ through Fig. 1, showing the gear-wheel B in section and the rack-frame and racks in end view and one of the guideways E' in broken outline. Fig. 3 shows a fragment of the cam $G^2$ with the friction-roller H in its cam-shaped groove, as seen in plan, the roller H being at the point of entering the curved portion of the channel in which it plays. Fig. 4 shows a fragment of the gear-wheel B, its sleeve and flanged pinion, and the rollers on the studs H and E in section on a fragment of the shaft D. Fig. $1^A$ is a side view, in elevation, showing the gear B in mesh with the irregular rack.

A designates a rack-frame attached to the bed-plate of a printing-press, and to it are attached the toothed racks C and C', one on one side and the other on the opposite side of the wheel-shaft D.

In Fig. 1 the gear-wheel B is shown to be constructed of two distinct forms, one part forming a regular semicircle, and the other part or half is of irregular form, and to correspond with said construction the rack C is arranged to engage with the regular portion of said gear, which is shown straight or regular, while the lower rack C', which is, with other constructions of my mechanism, arranged to operate with the irregular portion of said wheel B, is made of correspondingly-irregular form.

In Fig. 2 the wheel is shown in position to engage with the upper rack; but a portion of the wheel is broken away to show the rack behind it, while the lower portion of the said wheel is disengaged and runs along the side of the rack C'.

On one side of the wheel B is formed a slot or groove $b$, which extends to the rim of the wheel, as shown in Fig. 2 and indicated by the parallel broken lines in Fig 1. In said groove $b$ the double cranks or arms $b'$ operate. Said arms consist of a bar $b'$, secured to the end of the shaft D and extending both ways from it to the ends of said channel $b$. Upon the outer side and ends of said arms $b'$ are crank-pins E, provided with friction-rollers $e$, and on the side opposite to the slot $b$ the wheel B is provided with a long sleeve F, which passes through the journal-box F', as clearly shown in Fig. 6, in which a fragment of the wheel B is shown, and the arm or arms $b'$ in the opposite position in the slot $b$ from that shown in Fig. 2, as when the gear-wheel B is in gear with the rack C'. A pinion G, with flanges at each end of its cogs, is formed on the end of said sleeve F, into which a gear-wheel G' meshes, which in this instance is proportioned to make one revolution to two of the pinion G. One side of said gear-wheel G' is extended, so as to form a long hub, upon which are formed two parallel flanges which form a channel $G^2$, in which the roller of the stud H plays, as shown in Figs. 2 and 3, and on the lower side of the journal-box F' there is an arm or bracket which carries a pin or shaft parallel to the shaft D, upon which the gear-wheel G' both turns and slides longitudinally, and in the plane which passes through the parallel axes of the wheels B and G' and between the said shafts is a stud H, provided with a roller which plays in said channel G².

Rotary motion is imparted to the shaft D by any suitable means—as, for instance, in the direction indicated by the arrow in Fig. 1—the roller e playing in the guideway E' on the frame between the racks C C'. The roller e when passing through said channel E' actuates said rack-frame in such a manner that a point or pencil on the center of the pin E would describe the broken lines c c', which show the relative motions of the pin or pins E and rack-frame with each other. At the point when the wheel B is going out of contact with the rack C the roller e enters into the mouth of the guideway E' at its upper end at the moment the wheel B disengages with the rack C, after which all further motion for the time being is imparted to the rack-frame by said roller e, which as it passes through the other, in this case lower, portion of said channel and at the moment it leaves it has caused the rack C' to advance toward the wheel B, so as to engage with it. During the time that the crank-pin E is passing through the guideway E', as from points n to n', the curved portion of the cam G² comes into play on the stud H, the portion of the cam G² seen in Fig. 3 moving toward the observer, or the lower edge of the paper will now cause the curved part of the cam to act against said fixed stud H, and thus cause the gear-wheel and all the parts connected with it on its shaft to move toward its supporting-arm, and, owing to the flanges on the pinion G, will cause the sleeve F and the wheel B to move with it, and thus disengage the wheel B from the rack C, and at the same time cause it to engage with the rack C², all so arranged that by the time the stud H has passed the curved portion of the cam G² into the straight portion of the channel, the wheel B and rack C have become fully engaged, and the work of this said arrangement is accomplished by the pin E entering the guide-way E', and it then giving the rack its slight motion indicated by the dotted line from n to n'—that is, while the pin E is moving through most of said guideway E' the racks C and C' are stationary, and during the said time the curved portion of the channel G² is giving the gear-wheel B its longitudinal motion on its shaft, so as to pass from one rack to the other. By means of this construction the rack C' receives its full motion from the irregular portion of the wheel B, which when at its end and at the beginning of the regular portion of the wheel at the other end of the rack-frame, the parts E e on the opposite end of the arm b become engaged in and operate through a similar guideway to the one already shown and described in Fig. 1, and the cam G² now causes the wheel B to move in the opposite direction out of the rack C' and into gear with the regular rack C and regular portion of the semi-circle of the said wheel. The rack C projects down below the rack-frame, so that when the rack C' is engaged with the wheel the upper edge of the wheel has room to play on the side of the rack. The shaft D does not slide lengthwise in its boxes, but is provided with any well-known means in one of its boxes (not shown) to prevent such motion; but the sleeve F, with its attachments, slides freely only longitudinally on said shaft.

The wheel B is here proportioned to make just two revolutions for one double stroke of the racks. This fact becomes apparent by observing that the roller e, in passing down from its present position out of the guideway E' and until the rack C' becomes engaged, takes up about one-quarter of a revolution of the wheel B, the action of the wheel with the rack takes up a full half-revolution, and the entrance of the roller e into a similar guideway at the other end of the rack-frame up to its center takes up another quarter-revolution, which makes in all one complete revolution of the wheel for a single stroke of the rack C'. Then passing said roller through the upper half of said guideways and over the rack C will require another revolution, thus completing two revolutions of the wheel to one double stroke of the racks.

It is obvious that by arranging the wheel B so that it may have an odd number of revolutions for a double stroke of the racks only one crank-pin will be required; but if said motion of the racks is produced by an even number of revolutions of said wheel B, then two crank-pins will be required.

Irregular motion of the racks from a single and uniformly-moving gear-wheel is only obtainable through the form of construction and operation of the parts above described. Any variation in the number of revolutions of said wheel will necessitate its being made regular throughout.

I do not mean to limit my claims to the construction herein shown and described, as it is obvious that this is only one particular illustration of a general principle which may be modified in numerous ways.

What I claim is—

1. In a mechanical movement, parallel and rigidly-connected racks situated on opposite sides of a plane at right angles to the axis and on opposite sides of a wheel-shaft and connected at their ends by guideways, in combination with a gear-wheel and mechanism adapted to move said gear-wheel from one rack to another, and one or more crank-pins to engage with guideways, whereby reciprocating motion may be obtained, substantially as specified.

2. In a mechanical movement, parallel and rigidly-connected and irregular racks situated on opposite sides of a plane at right angles to the axis and on opposite sides of a wheel-shaft and connected at their ends by guideways, in combination with an irregular gear-wheel and mechanism adapted to move said gear-wheel from one rack to another, and crank-pins to engage with said guideways, whereby irregular reciprocating motion may be obtained, substantially as specified.

3. In a mechanical movement, parallel and rigidly-connected racks situated on opposite sides of a plane at right angles to the axis and on opposite sides of a longitudinally-fixed wheel-shaft and connected at their ends by guideways, in combination with a gear-wheel and mechanism adapted to move said gear-wheel from one rack to another, and one or more crank-pins to engage with said guideways, whereby reciprocating motion may be obtained, substantially as specified.

4. In a mechanical movement, a revolving and longitudinally-fixed shaft provided with a gear-wheel adapted to turn with and reciprocate longitudinally on said shaft, and one or more crank-pins attached to said wheel-shaft, in combination with mechanism to actuate said gear-wheel, racks facing on opposite sides of and at right angles to said wheel-shaft and connected at their ends by guideways adapted to receive said crank-pins, substantially as specified.

ROBERT MIEHLE.

Witnesses:
  GEO. W. FRITZ,
  P. DIENHART.